(12) United States Patent
Takasu et al.

(10) Patent No.: US 11,947,057 B2
(45) Date of Patent: Apr. 2, 2024

(54) PHOTODETECTOR AND RADIATION DETECTOR

(71) Applicant: KABUSHIKI KAISHA TOSHIBA, Tokyo (JP)

(72) Inventors: Isao Takasu, Setagaya (JP); Atsushi Wada, Kawasaki (JP); Yuko Nomura, Kawasaki (JP); Kohei Nakayama, Kawasaki (JP); Fumihiko Aiga, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 69 days.

(21) Appl. No.: 17/821,026

(22) Filed: Aug. 19, 2022

(65) Prior Publication Data
US 2023/0288581 A1    Sep. 14, 2023

(30) Foreign Application Priority Data

Mar. 9, 2022    (JP) ................................. 2022-035790

(51) Int. Cl.
*G01T 1/20*    (2006.01)
*C07F 5/02*    (2006.01)

(52) U.S. Cl.
CPC ............ *G01T 1/2018* (2013.01); *C07F 5/022* (2013.01)

(58) Field of Classification Search
None
See application file for complete search history.

(56) References Cited

U.S. PATENT DOCUMENTS

| 2017/0133603 | A1* | 5/2017 | Joung | ................ | C07D 409/14 |
| 2018/0143329 | A1 | 5/2018 | Takasu et al. | | |
| 2021/0280639 | A1* | 9/2021 | Hattori | .............. | H01L 27/14621 |
| 2023/0027447 | A1* | 1/2023 | Kobayashi | ........... | H10K 85/653 |

FOREIGN PATENT DOCUMENTS

JP    2018-85387 A    5/2018

OTHER PUBLICATIONS

Huang, H. et al. "Performance improvement mechanics of P3HT:PCBM inverted polymer solar cells using extra PCBM and extra P3HT interfacial layers" Organic Electronics 21 (2015) 126-131 (6 pages).

* cited by examiner

*Primary Examiner* — Edwin C Gunberg
(74) *Attorney, Agent, or Firm* — Oblon, McClelland, Maier & Neustadt, L.L.P.

(57) ABSTRACT

According to one embodiment, a photodetector includes a first conductive layer, a second conductive layer, and an organic layer provided between the first conductive layer and the second conductive layer. The organic layer includes a first region and a second region. The second region is provided between the first region and the second conductive layer. The first region includes a first compound and a second compound. The first compound includes a first mother skeleton. The second region includes the first compound and a third compound. The third compound includes the first mother skeleton. The third compound is different from the first compound. The second region does not include the second compound, or a concentration of the second compound in the second region is lower than a concentration of the second compound in the first region.

20 Claims, 6 Drawing Sheets

PHOTODETECTOR AND RADIATION DETECTOR

CROSS-REFERENCE TO RELATED APPLICATIONS

This application is based upon and claims the benefit of priority from Japanese Patent Application No. 2022-035790, filed on Mar. 9, 2022; the entire contents of which are incorporated herein by reference.

FIELD

Embodiments of the invention generally relate to a photodetector and radiation detector.

BACKGROUND

There is a photodetector that uses a photoelectric conversion layer or the like. It is desired to improve detection characteristics of the photodetector.

DETAILED DESCRIPTION

Figure 1:
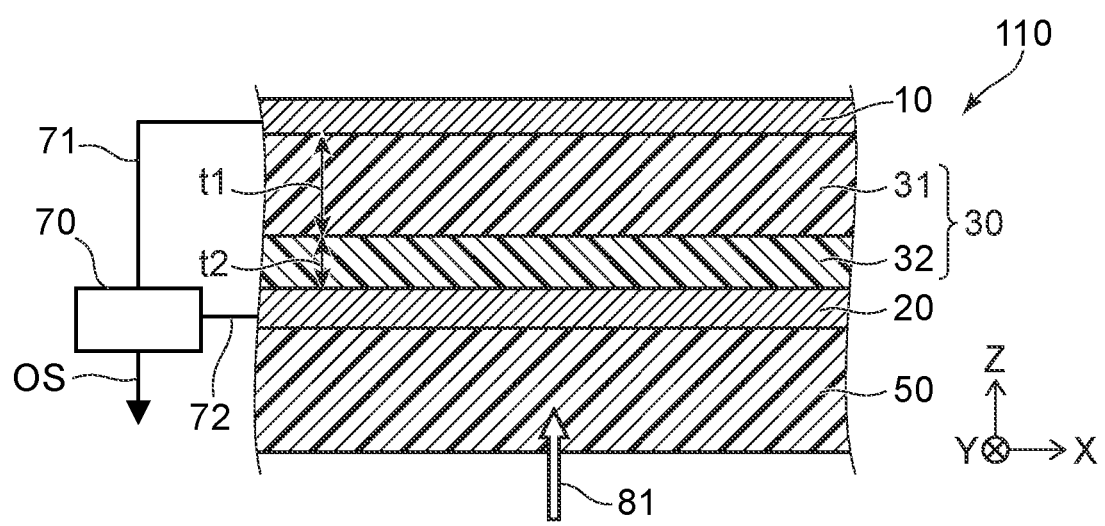
FIG. 1 is a schematic cross-sectional view illustrating a photodetector according to the first embodiment.

According to one embodiment, a photodetector includes a first conductive layer, a second conductive layer, and an organic layer provided between the first conductive layer and the second conductive layer. The organic layer includes a first region and a second region. The second region is provided between the first region and the second conductive layer. The first region includes a first compound and a second compound. The first compound includes a first mother skeleton. The second region includes the first compound and a third compound. The third compound includes the first mother skeleton. The third compound is different from the first compound. The second region does not include the second compound, or a concentration of the second compound in the second region is lower than a concentration of the second compound in the first region.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic cross-sectional view illustrating a photodetector according to a first embodiment.

Figure 2A:
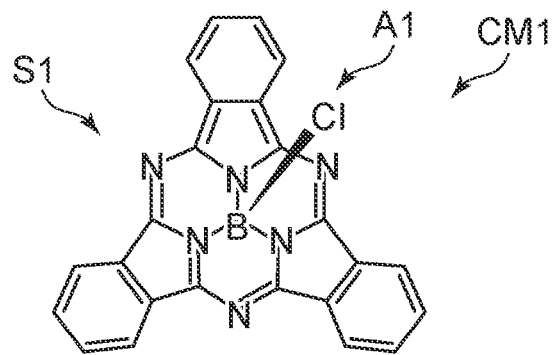
FIGS. 2A to 2C are schematic views illustrating material of the photodetector according to the first embodiment.
Figure 2B:
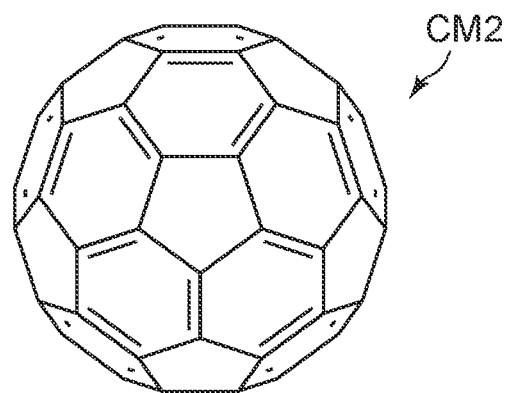
Figure 2C:
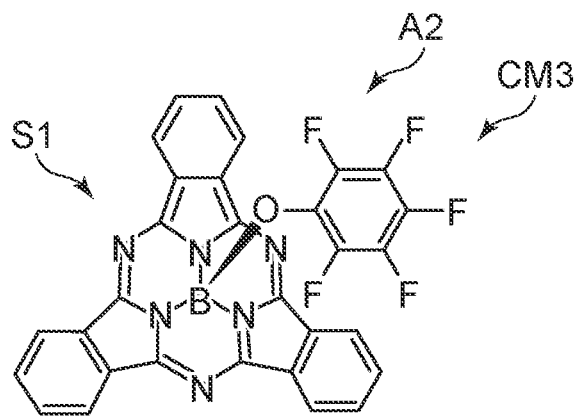

FIGS. 2A to 2C are schematic views illustrating material of the photodetector according to the first embodiment.

As shown in FIG. 1, a photodetector 110 according to the embodiment includes a first conductive layer 10, a second conductive layer 20, and an organic layer 30. The organic layer 30 is provided between the first conductive layer 10 and the second conductive layer 20.

The organic layer 30 includes a first region 31 and a second region 32. The second region 32 is provided between the first region 31 and the second conductive layer 20.

A direction from the second conductive layer 20 to the first conductive layer 10 is a Z-axis direction. One direction perpendicular to the Z-axis direction is defined as an X-axis direction. The direction perpendicular to the Z-axis direction and the X-axis direction is defined as the Y-axis direction.

The first conductive layer 10, the second conductive layer 20, and the organic layer 30 are, for example, along the X-Y plane. For example, the first region 31 and the second region 32 are along the X-Y plane.

FIGS. 2A to 2C exemplify the materials included in the organic layer 30. The first region 31 includes a first compound CM1 (see FIG. 2A) and a second compound CM2 (see FIG. 2B). The first compound CM1 includes the first mother skeleton S1.

In this example, the first compound CM1 includes chloroboron subphthalocyanine (SubPc). Boron subphthalocyanine corresponds to the first mother skeleton S1. The second compound includes one of fullerenes and fullerene derivatives.

For example, the first compound CM1 is of p-type. The second compound CM2 is of n-type. The first region 31 is, for example, an organic semiconductor layer.

The second region 32 includes the first compound CM1 and a third compound CM3 (see FIG. 2C). The third compound CM3 includes the first mother skeleton S1. The third compound CM3 is different from the first compound CM1.

In this example, the third compound CM3 includes pentafluorophenoxyboron subphthalocyanine (F5-SubPc).

The second region 32 does not include the second compound CM2. Alternatively, a concentration of the second compound CM2 in the second region 32 is lower than a concentration of the second compound CM2 in the first region 31. For example, the second region 32 does not substantially include the second compound CM2. The second region 32 may function as, for example, a hole transport layer.

As shown in FIG. 1, for example, a detection circuit 70 is provided. The detection circuit 70 is electrically connected with the first conductive layer 10 and the second conductive layer 20. The electrical connection is made, for example, by a first wiring 71 connected with the first conductive layer 10 and a second wiring 72 connected with the second conductive layer 20. The detection circuit 70 includes, for example, a charge amplifier. The first conductive layer 10 (first wiring 71) and the second conductive layer 20 (second wiring 72) are electrically connected with an input of the charge amplifier. The output of the charge amplifier becomes an output signal OS. The output signal OS changes according to light 81 being incident. Thus, the detection circuit 70 can output a signal (output signal OS) corresponding to the light 81 incident on the photodetector 110.

For example, the light 81 is incident on the organic layer 30 via the second conductive layer 20. The light 81 passes through the second region 32 and reaches the first region 31. In the first region 31, energy of the incident light 81 produces movable charged. The charges are taken out by applying a bias voltage between the first conductive layer 10 and the second conductive layer 20. The first region 31 functions as, for example, a photoelectric conversion layer.

In the embodiment, the second region 32 as described above is provided. As a result, it was found that leakage current can be suppressed. It was found that good time responsiveness can be obtained by providing such a second region 32. Hereinafter, an example of the evaluation result of the characteristics of the photodetector will be described.

Figure 3:
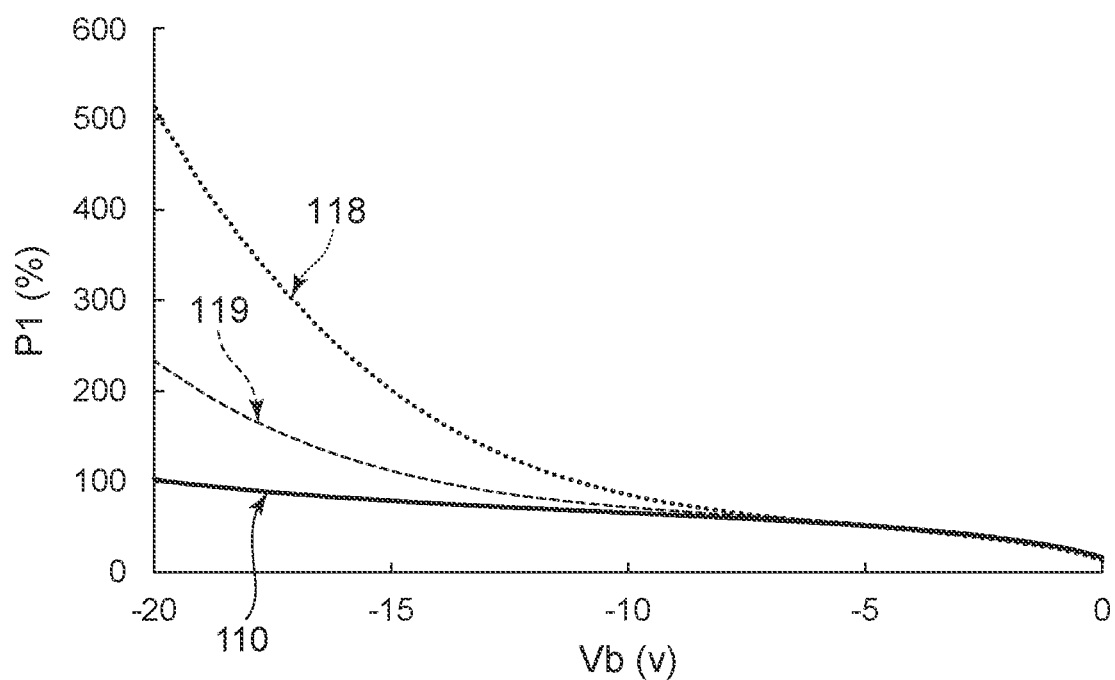
FIG. 3 is a graph illustrating the characteristics of the photodetector.

FIG. 3 is a graph illustrating characteristics of the photodetector.

FIG. 3 illustrates a measurement result of a signal obtained when the bias voltage applied between the first conductive layer 10 and the second conductive layer 20 is changed in a state where the light 81 is not incident. The horizontal axis of FIG. 3 is the bias voltage Vb. The vertical axis of FIG. 3 is the leak parameter P1. The leak parameter corresponds to the magnitude of the obtained signal. A large leak parameter P1 corresponds to the large leak current. The leak parameter P1 corresponds to the apparent quantum efficiency.

FIG. 3 shows the characteristics of the photodetectors 110, 118 and 119. In the photodetector 110, the second region 32 including the first compound CM1 and the third compound CM3 is provided. In the photodetector 118, the second region 32 is not provided. In the photodetector 119, the second region 32 includes only the first compound CM1 and does not include the third compound CM3.

As shown in FIG. 3, in the photodetector 118, the leak parameter P1 is large. In the photodetector 119, the leak parameter P1 is smaller than that of the photodetector 118. In the photodetector 110, the leak parameter P1 smaller than that of the photodetector 119 is obtained. As described above, according to the embodiment, the leakage current can be suppressed. As a result, high detection sensitivity can be obtained.

As described above, the leakage current can be suppressed by providing the second region 32 including the first compound CM1 and the third compound CM3.

In the photodetector 119 in which the second region 32 does not include the third compound CM3, for example, uniformity of the structure in the second region 32 is considered to be high. For example, the first compound CM1 is packed at a high density. Thereby, the conductivity is increased. As a result, it is considered that the leakage current becomes large.

On the other hand, in the photodetector 110 in which the second region 32 includes the first compound CM1 and the third compound CM3, it is considered that the uniformity of the structure in the second region 32 is low. For example, the second region 32 becomes bulky. For example, when the third compound CM3 different from the first compound CM1 is provided, the packing property is decreased. Thereby, it is considered that the conductivity becomes low and the leakage current becomes small.

Figure 4A:
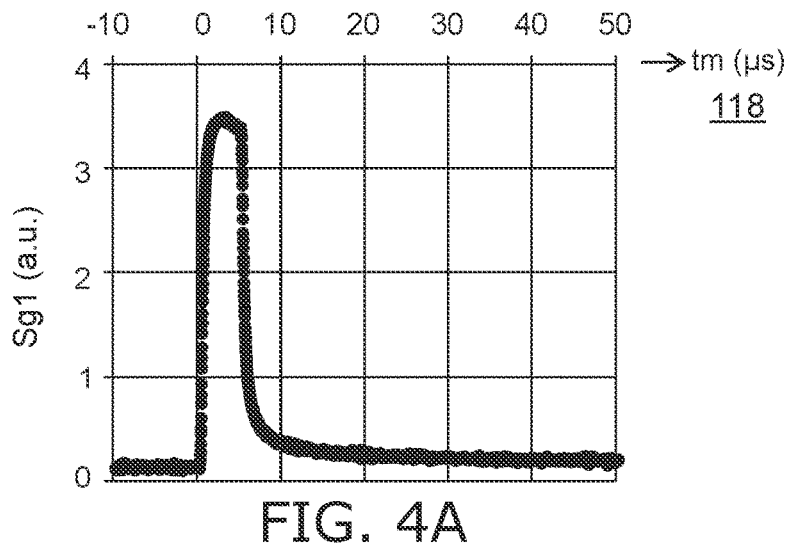
FIGS. 4A to 4C are graphs illustrating response characteristics of the photodetector.
Figure 4B:
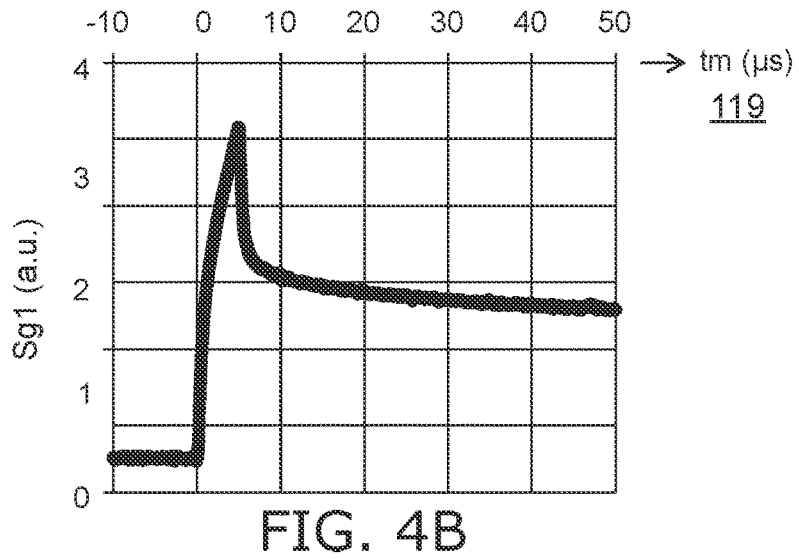
Figure 4C:
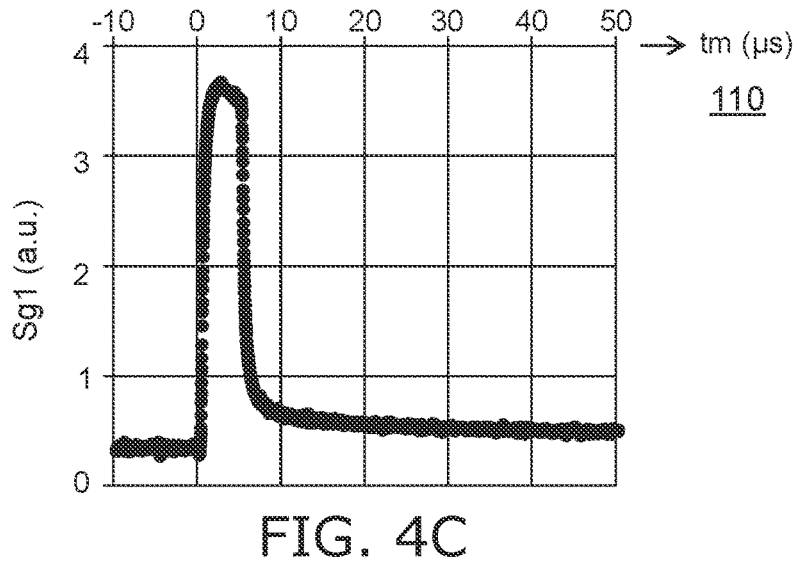

FIGS. 4A to 4C are graphs illustrating the response characteristics of the photodetector.

The horizontal axis of these figures is time tm. The vertical axis of these figures is the detected signal Sg1. FIG. 4A corresponds to the photodetector 118. FIG. 4B corresponds to the photodetector 119. FIG. 4C corresponds to the photodetector 110. In these measurements, the photodetectors are irradiated with a light pulse during the time tm from 0 μs to 5 μs. A change in the signal Sg1 corresponding to the optical pulse is observed.

As shown in FIG. 4A, the photodetector 118 can obtain good response characteristics for turning on and turning off. On the other hand, as shown in FIG. 4B, the photodetector 119 has a low response characteristic. In particular, in the off characteristic, the time for the signal Sg1 to return to the initial state is extremely long. As shown in FIG. 4C, in the photodetector 110, good response characteristics can be obtained at the turning on and the turning off. Good high-speed response can be obtained.

In the photodetector 119 in which the second region 32 does not include the third compound CM3, for example, it is considered that the carrier blocking property is high in the second region 32. It is considered that this is caused by that the second region 32 includes only the first compound CM1 and therefore the structure becomes uniform.

On the other hand, in the photodetector 110 in which the second region 32 includes the first compound CM1 and the third compound CM3, it is considered that the uniformity of the structure in the second region 32 is low. As a result, the blocking property of the carrier is lowered. As a result, it is considered that the accumulated carriers are efficiently moved to the outside and high-speed off characteristics can be obtained.

In the embodiment, it is preferable that the first region 31 does not include the third compound CM3. Alternatively, the concentration of the third compound CM3 in the first region 31 is preferably lower than the concentration of the third compound CM3 in the second region 32. For example, the first region 31 dose not substantially include the third compound CM3. Thereby, a high conversion efficiency can be obtained easily, for example.

For example, the first region 31 functions as a photoelectric conversion layer. For efficient photoelectric conversion, the thickness of the first region 31 is set to be thick to some extent. When the first compound CM1 and the third compound CM3 are provided in the thick first region 31, it becomes difficult for the carriers in the first region 31 to move within a short time. Since the third compound CM3 is not substantially provided in the first region 31, carriers can easily reach the conductive layer before disappearing. As a result, high conversion efficiency can be obtained.

As shown in FIG. 1, the thickness of the first region 31 in the first direction (Z-axis direction) from the second conductive layer 20 to the first conductive layer 10 is defined as the first thickness t1. The thickness of the second region 32 in the first direction is defined as the second thickness t2. The first thickness t1 is thicker than the second thickness t2. As a result, high conversion efficiency can be obtained. When the second thickness t2 is thin, for example, high-speed responsiveness (good on-characteristics and good off-characteristics) can be obtained.

In the embodiment, the first thickness t1 is preferably, for example, not less than 5 times and not more than 200 times the second thickness t2. The first thickness t1 may be, for example, not less than 8 times and not more than 80 times the second thickness t2.

In the embodiment, the first thickness t1 is preferably, for example, not less than 200 nm and not more than 2000 nm. The second thickness t2 is, for example, not less than 2 nm and not more than 100 nm.

In the first region 31, the first compound CM1 and the second compound CM2 may be mixed with each other. The first region 31 has, for example, a bulk heterojunction structure.

In the first region 31, the weight ratio of the first compound CM1 to the second compound CM2 is preferably, for example, not less than 0.3 and not more than 0.7. In the second region 32, the weight ratio of the first compound CM1 to the third compound CM3 is preferably not less than 0.3 and not more than 0.7.

In the embodiment, the first compound CM1 may be a compound including the first mother skeleton S1 or a derivative of the compound. As shown in FIG. 2A, the derivative includes a first group A1 bonded to the first mother skeleton S1. The first group A1 includes at least one selected from the group consisting of hydrogen, halogen elements, and organic groups. In the example of FIG. 2A, the first group A1 is chlorine.

The third compound CM3 is, for example, a derivative of a compound including the first mother skeleton S1. As shown in FIG. 2C, the derivative includes a second group A2 bonded to the first mother skeleton S1. The molecular weight of the first mother skeleton S1 is larger than the molecular weight of the first group A1 and larger than the molecular weight of the second group A2.

In one example, when the first group A1 is a halogen element, the second group A2 includes an organic group. The number of carbons included in the organic group is 5 or more. In one example, the molecular weight of the second group A2 is larger than the molecular weight of the first group A1. In one example, the size of the second group A2 is larger than the size of the first group A1. As a result, the third compound CM3 becomes bulkier than the first compound CM1.

For example, the first mother skeleton S1 includes a benzene ring. The third compound CM3 includes the second group A2 bonded to the first mother skeleton S1. The second group A2 includes a benzene ring. In this case, the first group A1 does not include a benzene ring. With such a configuration, the third compound CM3 becomes bulkier than the first compound CM1.

In the case where the second group A2 includes a benzene ring, the second group A2 may include fluorine bonded to the benzene ring. With such a configuration, the third compound CM3 becomes bulky.

In the case where the second group A2 includes a benzene ring, the benzene ring may be bonded to the first mother skeleton S1 via oxygen. Thereby, a bulky structure can be obtained. The benzene ring may be bonded to the first mother skeleton S1 via sulfur.

In one example, the first compound CM1 includes chloroboron subphthalocyanine and the third compound CM3 includes pentafluorophenoxyboron subphthalocyanine.

In the embodiment, the first conductive layer 10 includes, for example, a metal. The metal may include, for example, at least one selected from the group consisting of Al, Ag and Au. The second conductive layer 20 may include, for example, a metal oxide. The first conductive layer 10 may include, for example, ITO (Indium Tin Oxide). For example, the light transmittance of the second conductive layer 20 is higher than the light transmittance of the first conductive layer 10.

As shown in FIG. 1, the photodetector 110 may include a base body 50. The second conductive layer 20 is provided between the base body 50 and the first conductive layer 10. The base body 50 may include, for example, resin or glass. The base body 50 may be, for example, an organic film.

Figure 5:
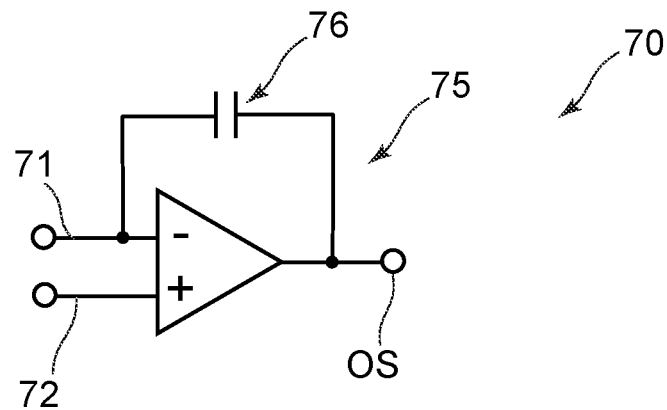
FIG. 5 is a circuit diagram illustrating the photodetector according to the first embodiment.

FIG. 5 is a circuit diagram illustrating the photodetector according to the first embodiment.

FIG. 5 illustrates a charge amplifier 75 provided in the detection circuit 70. The first wiring 71 is electrically connected the one of the two input terminals of the charge amplifier 75. The second wiring 72 is electrically connected with the other of the two input terminals of the charge amplifier 75. Thereby, the charge amplifier 75 is electrically connected with the first conductive layer 10 and the second conductive layer 20. A capacitance 76 is connected between the negative input of the charge amplifier 75 and the output terminal of the charge amplifier 75. For example, a voltage corresponding to the electric charge generated between the first conductive layer 10 and the second conductive layer 20 is obtained as the output signal OS.

In the charge amplifier 75, a resistance may be provided in parallel with the capacitance 76. Further an input terminal for reference voltage may be provided. Radiation may be detected in a structure including the first conductive layer 10, the second conductive layer 20, and the organic layer 30. The photodetector 110 may be a radiation detector.

Second Embodiment

The second embodiment relates to a radiation detector.

Figure 6:
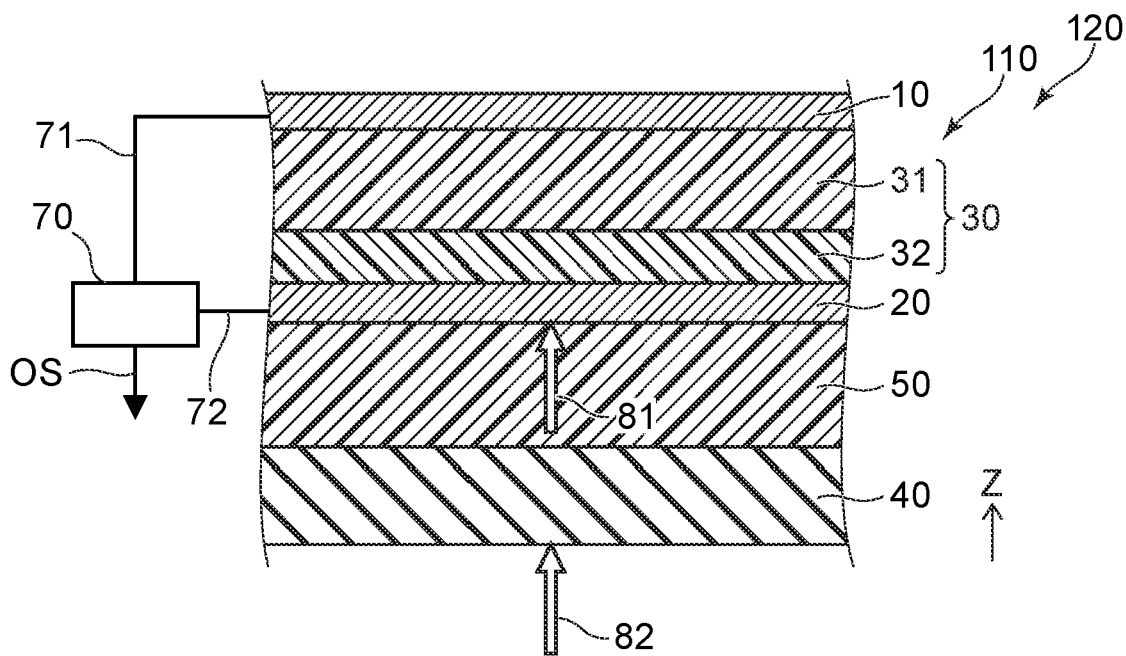
FIG. 6 is a schematic cross-sectional view illustrating a radiation detector according to the second embodiment.

FIG. 6 is a schematic cross-sectional view illustrating a radiation detector according to the second embodiment.

As shown in FIG. 6, a radiation detector 120 according to the embodiment includes a photodetector 110 according to the first embodiment and a scintillator layer 40. The second conductive layer 20 is located between the scintillator layer 40 and the organic layer 30. In this example, the base body 50 is provided. The base body 50 is provided between the scintillator layer 40 and the second conductive layer 20. The base body 50 may be considered to be provided in the photodetector 110.

For example, radiation 82 is incident on the scintillator layer 40. In the scintillator layer 40, light 81 corresponding to the radiation 82 is generated. The light 81 is incident on the organic layer 30. An electric signal corresponding to the radiation 82 is obtained. By providing the scintillator layer 40, the radiation 82 can be effectively detected.

The Radiation 82 is optional, for example. The radiation 82 may include, for example, β rays. For example, temporally discrete radiation 82 may be incident on the scintillator layer 40. In the embodiment, photoelectric conversion with good response characteristics is possible. Radiation 82 that is discrete in time can be efficiently detected.

The scintillator layer 40 may include, for example, CsI (Tl). For example, the scintillator layer 40 may include iodine, cesium and thallium. The scintillator layer 40 may include a plastic scintillator. The plastic scintillator comprises, for example, at least one selected from the group consisting of polystyrene, polyvinyltoluene and polyphenylbenzene.

Figure 7:
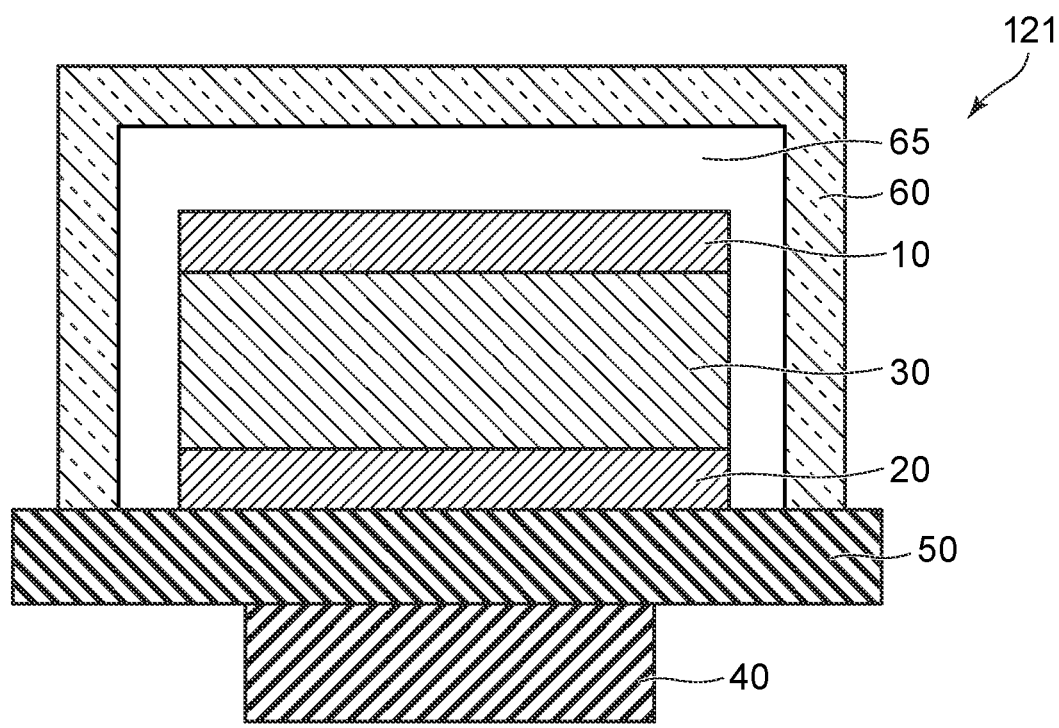
FIG. 7 is a schematic cross-sectional view illustrating the radiation detector according to the second embodiment.

FIG. 7 is a schematic cross-sectional view illustrating the radiation detector according to the second embodiment.

As shown in FIG. 7, in a radiation detector 121 according to the embodiment, a sealing member 60 is further provided. For example, glass is used for the base body 50 and the sealing member 60. The outer edge of the sealing member 60 is joined to the outer edge of the base body 50. The first conductive layer 10, the second conductive layer 20, and the organic layer 30 are provided in a space surrounded by the base body 50 and the sealing member 60. The first conductive layer 10, the second conductive layer 20, and the organic layer 30 are hermetically sealed by the base body 50 and the sealing member 60. Thereby, it becomes easier to obtain stable characteristics. High reliability can be obtained.

A space 65 is provided between the first conductive layer and the sealing member 60, between the second conductive layer 20 and the sealing member 60, and between the organic layer 30 and the sealing member 60. For example, an inert gas (for example, nitrogen gas) is enclosed in this space 65. The sealing member 60 may be provided in the photodetector 110.

Figure 8:
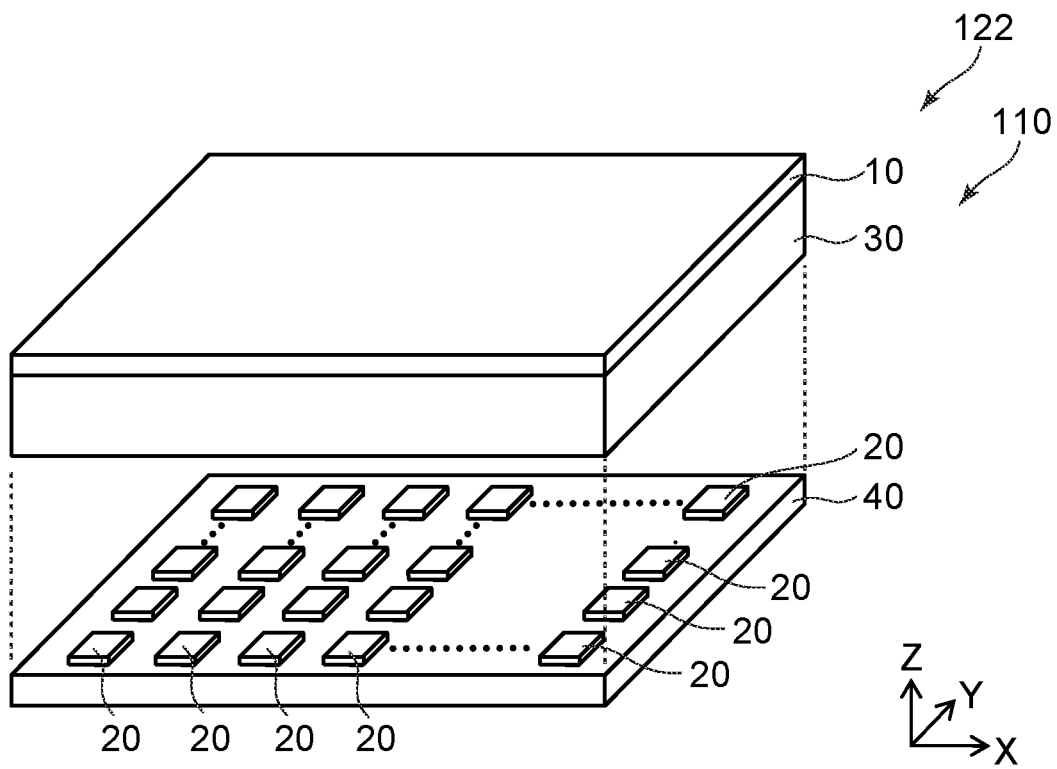
FIG. 8 is a schematic perspective view illustrating the radiation detector according to the second embodiment.

FIG. 8 is a schematic perspective view illustrating the radiation detector according to the second embodiment.

In FIG. 8, some of the elements included in a radiation detector 122 are drawn separated from each other for the sake of readability of the figure.

In the radiation detector 122, a plurality of second conductive layers 20 are provided. The plurality of second conductive layers 20 are arranged along a plane (for example, the X-Y plane) crossing the first direction (the Z-axis direction). The plurality of second conductive layers 20 are arranged along the X-axis direction and the Y-axis direction, for example. The plurality of second conductive layers 20 are arranged in a matrix configuration, for example. In the radiation detector 122, an image corresponding to the radiation 82 is obtained. The configuration of the photodetector 110 described with respect to the first embodiment can be applied to the radiation detector 122.

The embodiment may include the following configurations (for example, technical proposals).

(Configuration 1)
A photodetector, comprising:
a first conductive layer;
a second conductive layer; and
an organic layer provided between the first conductive layer and the second conductive layer,
the organic layer including a first region and a second region, the second region being provided between the first region and the second conductive layer,
the first region including a first compound and a second compound, the first compound including a first mother skeleton,
the second region including the first compound and a third compound, the third compound including the first mother skeleton, the third compound being different from the first compound, and
the second region not including the second compound, or a concentration of the second compound in the second region being lower than a concentration of the second compound in the first region.

(Configuration 2)
The photodetector according to Configurations 1, wherein the first region does not include the third compound, or a concentration of the third compound in the first region is lower than a concentration of the third compound in the second region.

(Configuration 3)
The photodetector according to Configuration 1 or 2, wherein
the first compound is of p-type, and
the second compound is of n-type.

(Configuration 4)
The photodetector according to any one of Configurations 1-3, wherein
the first compound includes a first group bonded to the first mother skeleton,
the third compound includes a second group bonded to the first mother skeleton, and
a molecular weight of the second group is larger than a molecular weight of the first group.

(Configuration 5)
The photodetector according to any one of Configurations 1-3, wherein
the first compound includes a first group bonded to the first mother skeleton,
the third compound includes a second group bonded to the first mother skeleton,
the first group is a halogen element, and
the second group includes an organic group.

(Configuration 6)
The photodetector according to any one of Configurations 1-3, wherein
the first mother skeleton includes a benzene ring,
the third compound includes a second group bonded to the first mother skeleton, and
the second group includes a benzene ring.

(Configuration 7)
The photodetector according to Configuration 6, wherein the second group includes fluorine bonded to the benzene ring.

(Configuration 8)
The photodetector according to Configuration 6 or 7, wherein the benzene ring is bonded to the first mother skeleton via oxygen.

(Configuration 9)
The photodetector according to any one of Configurations 1-3, wherein
the first compound includes chloroboron subphthalocyanine, and
the third compound includes pentafluorophenoxyboron subphthalocyanine.

(Configuration 10)
The photodetector according to Configuration 9, wherein the second compound includes one of fullerenes and fullerene derivatives.

(Configuration 11)
The photodetector according to any one of Configurations 1-10, wherein a first thickness of the first region in a first direction from the second conductive layer to the first conductive layer is thicker than a second thickness of the second region in the first direction.

(Configuration 12)
The photodetector according to Configuration 11, wherein the first thickness is not less than 5 times and not more than 200 times the second thickness.

(Configuration 13)
The photodetector according to Configuration 11, wherein
the first thickness is not less than 200 nm and not more than 2000 nm, and
the second thickness is not less than 2 nm and not more than 100 nm.

(Configuration 14)
The photodetector according to any one of Configurations 1-13, wherein the first compound and the second compound are mixed in the first region.

(Configuration 15)

The photodetector according to any one of Configurations 1-14, wherein in the first region, a weight ratio of the first compound to the second compound is not less than 0.3 and not more than 0.7.

(Configuration 16)

The photodetector according to any one of Configurations 1-15, wherein in the second region, a weight ratio of the first compound to the third compound is not less than 0.3 and not more than 0.7.

(Configuration 17)

The photodetector according to any one of Configurations 1-16, wherein a light transmittance of the second conductive layer is higher than a light transmittance of the first conductive layer.

(Configuration 18)

A radiation detector, comprising:
the photodetector according to any one of Configurations 1-17; and
a scintillator layer,
the second conductive layer being provided between the scintillator layer and the organic layer.

(Configuration 19)

The radiation detector according to Configuration 18, further comprising a base body provided between the scintillator layer and the second conductive layer.

(Configuration 20)

The radiation detector according to Configuration 18 or 19, wherein temporally discrete radiation can be incident on the scintillator layer.

(Configuration 21)

A radiation detector, comprising:
a first conductive layer;
a second conductive layer; and
an organic layer provided between the first conductive layer and the second conductive layer,
the organic layer including a first region and a second region, the second region being provided between the first region and the second conductive layer,
the first region including a first compound and a second compound, the first compound including a first mother skeleton,
the second region including the first compound and a third compound, the third compound including the first mother skeleton, the third compound being different from the first compound, and
the second region not including the second compound, or a concentration of the second compound in the second region being lower than a concentration of the second compound in the first region.

According to the embodiment, it is possible to provide a photodetector and a radiation detector whose characteristics can be improved.

In the specification of the application, the state of being electrically connected includes a state in which two conductors are in direct contact with each other. The electrically connected state includes a state in which two conductors are connected by another conductor (for example, wiring). The electrically connected state includes a state in which a switching element (transistor or the like) is provided between the paths between the two conductors and a state in which current flows in the path between the two conductors can be formed.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in photodetectors and radiation detectors such as conductive layers, organic layers, compounds, scintillator layers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all photodetectors and radiation detectors practicable by an appropriate design modification by one skilled in the art based on the photodetectors and the radiation detectors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A photodetector, comprising:
a first conductive layer;
a second conductive layer; and
an organic layer provided between the first conductive layer and the second conductive layer,
the organic layer including a first region and a second region, the second region being provided between the first region and the second conductive layer,
the first region including a first compound and a second compound, the first compound including a first mother skeleton,
the second region including the first compound and a third compound, the third compound including first mother skeleton, the third compound being different from the first compound, and
the second region not including the second compound, or a concentration of the second compound in the second region being lower than a concentration of the second compound in the first region.

2. The photodetector according to claim 1, wherein the first region does not include the third compound, or a concentration of the third compound in the first region is lower than a concentration of the third compound in the second region.

3. The photodetector according to claim 2, wherein
the first compound is of p-type, and
the second compound is of n-type.

4. The photodetector according to claim 1, wherein
the first compound includes a first group bonded to the first mother skeleton,
the third compound includes a second group bonded to the first mother skeleton, and
a molecular weight of the second group is larger than a molecular weight of the first group.

5. The photodetector according to claim 1, wherein
the first compound includes a first group bonded to the first mother skeleton,
the third compound includes a second group bonded to the first mother skeleton,
the first group is a halogen element, and
the second group includes an organic group.

6. The photodetector according to claim 1, wherein
the first mother skeleton includes a benzene ring,
the third compound includes a second group bonded to the first mother skeleton, and
the second group includes a benzene ring.

7. The photodetector according to claim 6, wherein the second group includes fluorine bonded to the benzene ring.

8. The photodetector according to claim 6, wherein the benzene ring is bonded to the first mother skeleton via oxygen.

9. The photodetector according to claim 1, wherein
the first compound includes chloroboron subphthalocyanine, and
the third compound includes pentafluorophenoxyboron subphthalocyanine.

10. The photodetector according to claim 9, wherein the second compound includes one of fullerenes and fullerene derivatives.

11. The photodetector according to claim 1, wherein a first thickness of the first region in a first direction from the second conductive layer to the first conductive layer is thicker than a second thickness of the second region in the first direction.

12. The photodetector according to claim 11, wherein the first thickness is not less than 5 times and not more than 200 times the second thickness.

13. The photodetector according to claim 11, wherein
the first thickness is not less than 200 nm and not more than 2000 nm, and
the second thickness is not less than 2 nm and not more than 100 nm.

14. The photodetector according to claim 1, wherein the first compound and the second compound are mixed in the first region.

15. The photodetector according to claim 1, wherein in the first region, a weight ratio of the first compound to the second compound is not less than 0.3 and not more than 0.7.

16. The photodetector according to claim 1, wherein in the second region, a weight ratio of the first compound to the third compound is not less than 0.3 and not more than 0.7.

17. A radiation detector, comprising:
the photodetector according to claim 1; and
a scintillator layer,
the second conductive layer being provided between the scintillator layer and the organic layer.

18. The radiation detector according to claim 17, further comprising a base body provided between the scintillator layer and the second conductive layer.

19. The radiation detector according to claim 17, wherein temporally discrete radiation can be incident on the scintillator layer.

20. A radiation detector, comprising:
a first conductive layer;
a second conductive layer; and
an organic layer provided between the first conductive layer and the second conductive layer,
the organic layer including a first region and a second region, the second region being provided between the first region and the second conductive layer,
the first region including a first compound and a second compound, the first compound including a first mother skeleton,
the second region including the first compound and a third compound, the third compound including the first mother skeleton, the third compound being different from the first compound, and
the second region not including the second compound, or a concentration of the second compound in the second region being lower than a concentration of the second compound in the first region.

* * * * *